May 11, 1965

A. KLEIN ETAL
METHOD AND APPARATUS FOR REGULATING THE SPEED OF ROTATING BODIES

Filed April 5, 1963

3,182,429

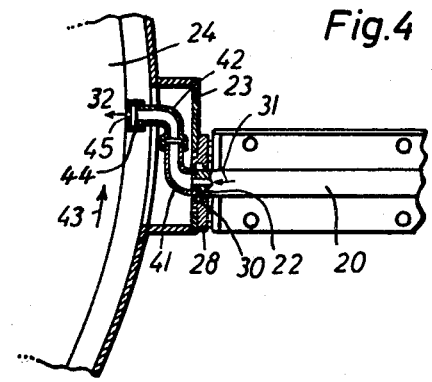
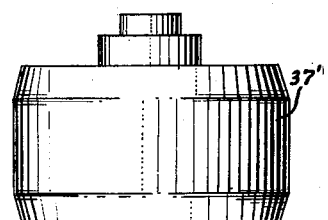
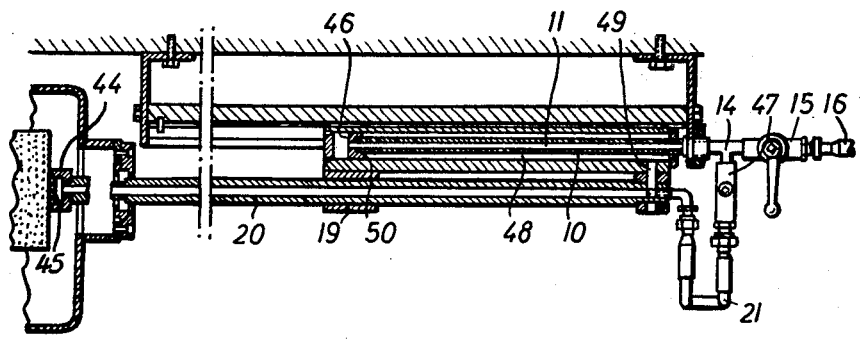

United States Patent Office 3,182,429
Patented May 11, 1965

---

3,182,429
METHOD AND APPARATUS FOR REGULATING THE SPEED OF ROTATING BODIES
Arthur Klein, Netphen, and Paul Enders, Eiserfeld, Sieg, Germany, assignors to H. A. Waldrich G.m.b.H., Siegen, Westphalia, Germany
Filed Apr. 5, 1963, Ser. No. 270,966
Claims priority, application Germany, Apr. 11, 1962, W 32,030
10 Claims. (Cl. 51—134.5)

The purpose of the invention is to regulate, generally maintain constant, the peripheral speed of rotating bodies, the diameter of which changes, generally decreases, during operation in this way to ensure constant output for example in machining and to enable a working operation to be carried out in the shortest possible time by making full use of the machine. Accordingly the invention relates, as will be explained by particular reference to the example of a grinding machine, in general to the maintaining constant of the peripheral speed of a rotating body the diameter of which is decreasing and thus also to the machining of rotating parts on lathes as well as to similar problems in the machine tool and other fields.

The problem has already been solved in the chosen example of a grinding machine by the reduction in diameter of the rotating body being ascertained intermittently or continuously by mechanical feeling and utilising the measured value for adjusting the rotating body or the tool in particular the grinding head. Having regard to the surface character of the rotating body and its peripheral speed it is desirable to avoid mechanical feeling of the periphery of the rotating body. It is effected according to the invention by discharging a jet of fluid against the rotating surface of the rotating body and deriving from the flow pattern of the fluid a measure of the diameter of the rotating body and therefore of the appropriate speed of rotation. The jet of fluid will generally be discharged radially from a guiding member such as a nozzle and the back pressure which the jet exerts on the nozzle constitutes the measure by reference to which the speed of the rotating body is regulated.

In a particularly simple case this can be effected by the jet being discharged through a nozzle or some other suitable mouthpiece the opening of which is located close to the periphery of the rotating body so that the back pressure of the jet on the mouthpiece is influenced by the peripheral surface of the rotating body. As soon as the diameter of the rotating body decreases, its surface moves away from the surface of the mouthpiece and the back pressure on the mouthpiece falls. This quantity can be measured and be used to increase the speed of the rotating body.

As the problem with which the invention is concerned arises in machining involving removal of material, especially in grinding it is desirable to use as the fluid a fluid which is already available such as cooling water whereby the provision for carrying out the method of the invention is simplified because coolant systems are always present in any case on such machine tools. In other cases however a jet of air may be discharged from the nozzle.

If the nozzle is fixed, as the diameter of the grinding wheel decreases, the law according to which the back pressure falls must be taken into account. This depends not only on the general laws of hydrodynamics but is also a function of the peripheral speed and surface character of the wheel because both these factors cause flow of the fluid which substantially upsets the flow pattern of the jet. A further difficulty is that the diameter can fall to such a value that it falls outside the range over which the nozzle is technically effective but must also be borne in mind that the grain of grinding wheels covers substantial variations so that here also correction which will give a satisfactory result can only be carried out with difficulty.

In order to over-come this short-coming of the above embodiment of the invention it is proposed to arrange the nozzle movably and to control it so as to maintain the back pressure constant. This requires a feed arrangement for the nozzle which when the back pressure falls brings about a forward movement of the nozzle until the original back pressure is again reached. In this case according to the invention the movement of the nozzle which is brought about by a servo control is used as the measure for regulating the speed because with constant back pressure the distance of the nozzle opening from the periphery of the rotating body is also constant and thus the position of the nozzle serves as an exact reference point for the diameter at any instant of the rotating body.

According to a further development of the invention this feed arrangement can be dispensed with by constructing the nozzle as a plate nozzle that is one over which the jet which strikes the peripheral surface of the rotating body radially is turned substantially symmetrically all round the axis through 90° and thus produces so great a pressure reduction that the nozzle free to move radially with respect to the grinding wheel follows the pressure reduction i.e. moves towards the grinding wheel until there is equilibrium between the pressure reduction due to diffuser action on one hand and the impact pressure and back pressure on the other hand is established. Under given conditions therefore the nozzle sets itself at a fixed distance from the peripheral surface of the grinding wheel.

Here again however the considerable effects of the surface quality of the rotating body on the flow pattern must be taken into account as also the cylindrical curvature of the peripheral surface of the rotating body. Accordingly the plate nozzle can be curved to correspond with the greatest diameter of the rotating body in order to achieve a certain approximation. However the curvature of the plate nozzle could be made to correspond to the mean diameter and the nozzle can also be given a form corresponding with the interference with the flow pattern at a mean speed and a chosen grain. It has been found advantageous furthermore to provide the plate nozzle with a rim flange substantially perpendicular to the plate.

A further advantage of the use of a plate nozzle in carrying out the invention is that there is a wide spread of the fluid over a considerable, even if not the whole, breadth of the rotating body so that a coolant can here be used with advantage which is directed on the grinding wheel in a wide sheet.

A still further development of the invention which increases the accuracy of adjustment of the speed consists in bringing the nozzle mouth as close as possible to the rotating body. This is effected by the pressure of the flowing medium acting upon a piston which feeds the rotating movable nozzle towards the rotating body, the dimensions of the piston being such that the mouth of the nozzle is brought close to the rotating body, but not into contact with it. This arrangement has the further advantage that pressure variations in the medium are of little effect. While when coolant is used pressure variations are not to be feared because as a rule a machine tool is provided with a coolant system having a pump driven by a separate motor the output of which is constant so that the pressure distribution in the whole system remains constant, when the medium is drawn from some general supply for example the compressed air supply for a whole factory there is a danger that the pressure varies with varying demand on the total supply and especially with increased demand in the immediate neighborhood. If now a nozzle is used according to the invention the back pressure falls when the supply pressure falls but at the same time the pressure on the piston against which the back pressure acts also falls so that compensation occurs. When a plate nozzle is used the gap between the plate nozzle and the peripheral surface of the rotating body which would usually be formed is reduced by the provision of the piston. If the supply pressure falls, suction between the surfaces of the plate nozzle and the rotating body falls and could lead to the plate nozzle approaching the rotating body too closely. As however the pressure on the piston falls at the same time and in this case also compensation occurs.

The invention will be further described with reference to two examples of embodiment illustrated in the accompanying drawings.

FIGURE 4 is a view similar to FIG. 3 of part of the second example.

FIGURE 5 is a view similar to FIG. 1 of the second example.

FIG. 6 is a sectional view taken on the line 6—6 of FIG. 3.

Figure 1:
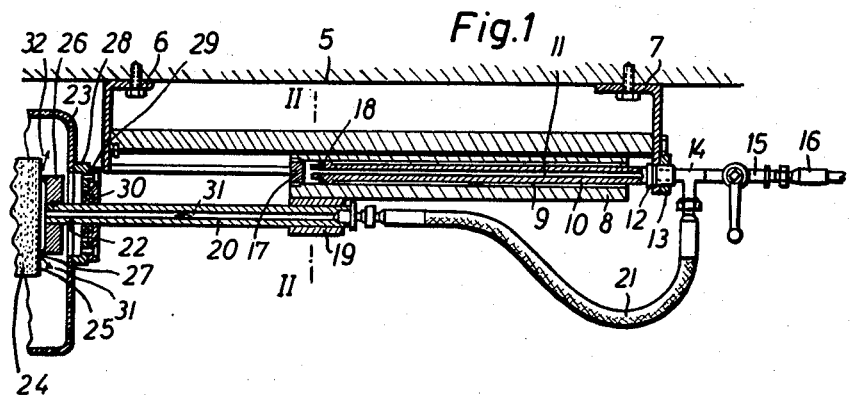
FIGURE 1 is a longitudinal section of the first example.
Figure 2:
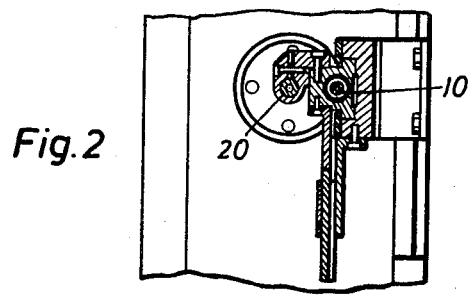
FIGURE 2 is a section on the line II—II of FIG. 1.
Figure 3:
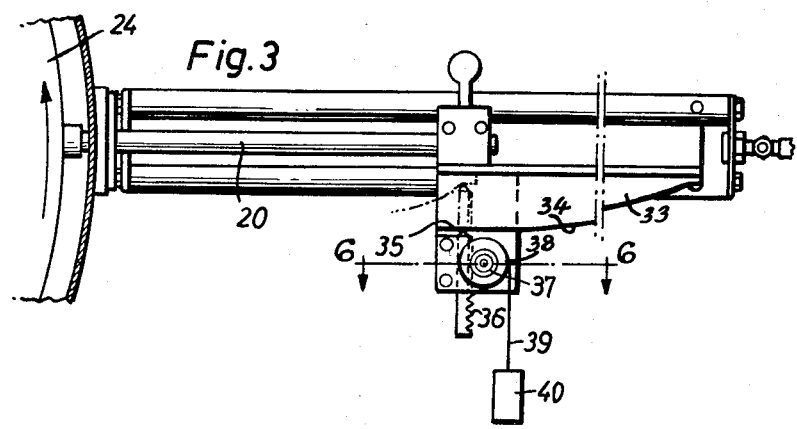
FIGURE 3 is a side view of FIG. 1 with one part in section.

In the first example shown in FIGS. 1 to 3 a guide-way 5 is secured by two angle brackets 6, 7 to the grinding wheel slide not shown of a grinding machine. On the guide-way 5 is longitudinally slidable a slide 8 having a bore 9 serving as a cylinder. In this bore works a piston and piston rod assembly 10 having an internal bore 11. The piston rod is fixed to the angle bracket 7 by the aid of a shoulder 12 and nut 13. The bore 11 is connected through a T-piece 14 and a stop cock 15 with a compressed air pipe 16 which is connected to some suitable supply.

The bore 9 in the slide 8 is closed by a plug 17 and the piston is provided with a packing ring 18.

To the slide 8 is secured a holder 19 which carries a nozzle pipe 20 extending parallel to the guide-way 5. This pipe is connected by a hose 21 with the T-piece 14 and its forward end 22 is inside the protecting hood 23 of the grinding wheel 24, the peripheral surface 25 of which is to be supervised in accordance with the invention. The nozzle pipe 20 terminates in a plate nozzle 25 the periphery of the plate of which has a forwardly projecting rim 27 substantially perpendicular to the plate. The pipe 20 is sealed to the hood 23 by a flange 28, cover 29 and a packing 30.

The pressure medium by way of the T-piece 14 acts through the bore 11 on the piston and flows out of the plate nozzle as indicated by the arrows 31, 32 so that there is an outflow between two surfaces, the medium in its outflow in the direction of the arrow 31 exerting an impact pressure on the grinding wheel 24 by which the back pressure on the nozzle pipe 20 is increased while the diffuser action arising between the plate and the periphery of the wheel practically without any dead flow generates a pressure reduction which is supplemented by the pressure acting between the piston 10 and the plug 17 on the slide 8 so that only a very narrow gap is left between plate nozzle 26 and the periphery 25 of the grinding wheel 24.

As FIG. 3 shows to the slide 8 is secured a template 33 which is exchangeable and against the controlling edge 34 of which a feeler 35 bears. The feeler 35 is movable perpendicular to the movement of the slide 8 towards and away from the edge 34 and is provided with a rack 36 which meshes with a pinion 37. By means of a drum 38, wire cable 39 and weight 40 the feeler 35 is kept under constant light pressure against the edge 34. The rotation of the pinion 37 is transmitted to a regulating resistance 37', as shown in FIG. 6 which controls the speed of the driving motor for the grinding wheel and increases it in the measure of the reduction in diameter of the grinding wheel as this occurs during the operation of the machine.

In the second example shown in FIGS. 4 and 5 on the forward end 22 of the pipe 20 is set a swan neck consisting of two 90° bends 41 and 42 located within the protecting hood 23 for the grinding wheel 24. The wheel rotates in the direction of the arrow 43. A nozzle 44 on the end of the swan neck has a row of bores 45 side by side, the line on which these bores lie being parallel to the axis of the grinding wheel. The flow out of these bores is against the grinding wheel in the direction of the arrow 32. The nozzle has its surface curved corresponding with the diameter of the grinding wheel, which can be produced by grinding against the wheel by pressing the nozzle forward with no or only very slight flow through it. The swan neck in known manner prevents the nozzle from sticking.

FIGURE 5 shows the pipe 16 for taking compressed air from a supply which can be admitted or cut off by the valve 15. The full pressure in the pipe when the valve is open through the T-piece 14 and bore 11 acts on the front end 46 of the piston structure. To the T-piece 14 is connected a reducing valve 47 which reduces the pressure of the air reaching the nozzle. The hose 21 here is somewhat differently arranged from the example of FIG. 1 but this is of no basic importance. The pipe 20 extends further back and a connecting passage 49 connects the pipe with the annular space 48 between the piston structure 10 and bore 9 so that the reduced pressure also acts on the annular rear surface 50 of the piston and the nozzle 44 is therefore only pushed forward with a pressure equal to the difference between the pressure acting on the front of the piston and the pressure acting on the back of the piston.

Various modifications can be made. Thus when air is used as the medium the effect of the grain of the wheel can be reduced by providing the wheel with a uniform liquid covering which covers the grain in the region at which the measurement according to the invention is effected. The region of measurement can be located that it follows a place where coolant is supplied. However as already mentioned coolant itself can be used as the flowing medium and to reduce the effect of the grain of the wheel part of the coolant can be supplied immediately in advance of the place of measurement. Further the margin of the plate can be made flexible so that it can be adapted to changing curvature of the grinding wheel.

It will be obvious to those skilled in the art that various changes may be made in the invention without departing from the spirit and scope thereof, and therefore the invention is not limited by that which is shown in the drawings and described in the specification, but only as indicated in the appended claims.

What we claim is:

1. An apparatus for regulating the speed of the peripheral surface of a rotating body the diameter of which decreases during operation, said apparatus comprising a nozzle having an end mounted for movement toward the periphery of said body and for directing a jet of fluid against the peripheral surface of said body, a fluid motor connected to said nozzle for moving the same toward said body, a common source of fluid pressure connected to said nozzle and said motor, means for regulating the speed of rotation of said body and means for adjusting said speed regulating means by movement of said nozzle, said motor being so designed as to exert a moving force on said nozzle which is equal to the back pressure on said nozzle resulting from said jet impinging on said peripheral surface when said nozzle is at a predetermined distance from said peripheral surface.

2. An apparatus as defined in claim 1, in which said nozzle includes a plate mounted on said end adjacent said body, said plate extending radially of said nozzle and being disposed substantially normal to the axis thereof, the space between said peripheral surface and said plate serving to diffuse the fluid discharging from said nozzle.

3. An apparatus as defined in claim 2, in which said plate is curved to substantially conform to the curvature of said body.

4. An apparatus as defined in claim 2, in which said plate is provided with a peripheral flange projecting toward said body at substantially right angles to the plate of said plane.

5. An apparatus as defined in claim 1, in which said body is driven by an electric motor and in which the means for regulating the speed of said body comprises a rheostat connected to said motor.

6. An apparatus as defined in claim 5, in which the means for adjusting said speed regulating means comprises a cam mounted on said nozzle for movement therewith, a cam follower engaging said cam, rack teeth on said follower and a pinion connected to said rheostat and meshing with said rack teeth, whereby upon movement of said nozzle said rheostat will be adjusted to regulate the speed of said body.

7. An apparatus as defined in claim 1, in which said fluid motor comprises a cylinder fixed to said nozzle and movable therewith and a piston slidably received in said cylinder and fixed against movement, said fluid pressure being introduced into said cylinder on one side of said piston.

8. An apparatus as defined in claim 7, in which a pressure reducing valve is provided between said fluid pressure source and said nozzle and in which full fluid pressure is introduced into said cylinder at one side of said piston and a reduced fluid pressure supplied to said nozzle and to the opposite side of said piston.

9. An apparatus as defined in claim 1, in which the peripheral surface of said body is provided with a uniform liquid coating to provide a uniform peripheral surface on said body regardless of changes in the character or grain size of said body.

10. A method for regulating the speed of the peripheral surface of a rotating tool the diameter of which decreases during operation, said method comprising the steps of directing a jet of fluid solely against the peripheral surface of said tool from a nozzle disposed a fixed distance from said surface, whereby the back pressure of said jet decreases as the diameter of said tool decreases, measuring the decrease in back pressure and utilizing such measurement to regulate the speed of rotation of said tool.

References Cited by the Examiner
UNITED STATES PATENTS 2,302,304 11/42 Elberty _____ 51—134.5
2,858,652 11/58 Luthman et al. _____ 51—267

FOREIGN PATENTS 697,949 9/53 Great Britain.

LESTER M. SWINGLE, Primary Examiner.
J. SPENCER OVERHOLSER, Examiner.